United States Patent
Peake et al.

(10) Patent No.: US 10,175,682 B2
(45) Date of Patent: Jan. 8, 2019

(54) AUTOMATION CONTROL SYSTEM POINT CONFIGURATION FROM CONTROLLER PROGRAM FILES

(71) Applicant: Honeywell International Inc., Morris Plains, NJ (US)

(72) Inventors: Stewart Peake, Heidelberg (AU); David Barry Granatelli, Lilyfield (AU)

(73) Assignee: Honeywell International Inc., Morris Plains, NJ (US)

( * ) Notice: Subject to any disclaimer, the term of this patent is extended or adjusted under 35 U.S.C. 154(b) by 316 days.

(21) Appl. No.: 15/066,683

(22) Filed: Mar. 10, 2016

(65) Prior Publication Data
US 2017/0261969 A1    Sep. 14, 2017

(51) Int. Cl.
G05B 19/00    (2006.01)
G05B 19/418   (2006.01)
G05B 19/042   (2006.01)

(52) U.S. Cl.
CPC ... G05B 19/41835 (2013.01); G05B 19/0426 (2013.01); *G05B 2219/31368* (2013.01); *G05B 2219/32404* (2013.01)

(58) Field of Classification Search
CPC .............. G05B 19/41835; G05B 19/0426
See application file for complete search history.

(56) References Cited

U.S. PATENT DOCUMENTS

| 7,684,875 B2 | 3/2010 | Jundt et al. |
| 8,700,671 B2 | 4/2014 | Ougarov et al. |
| 2006/0206860 A1* | 9/2006 | Dardinski .............. G05B 15/02 717/105 |
| 2006/0206866 A1* | 9/2006 | Eldrige .................. G05B 15/02 717/122 |
| 2010/0293360 A1* | 11/2010 | Schoop ............... G06F 9/44505 713/1 |
| 2014/0129002 A1 | 5/2014 | Brandes et al. |
| 2015/0019191 A1* | 1/2015 | Maturana .............. G05B 17/02 703/13 |

FOREIGN PATENT DOCUMENTS

| DE | 102013113640 A1 | 6/2015 |
| EP | 2924562 A2 | 9/2015 |

* cited by examiner

*Primary Examiner* — Nicholas J Tobergte

(57) ABSTRACT

A method of configuring an automation control system using point configuration software. At least an extract from a control program file having program elements and program element attributes for executing in an automatic controller of the automation control system is translated into a common representation including common program element types and common attributes. Mapping template files are applied including mapping rules and mapping parameters defining how the program elements and program element attributes are mapped into at least one automation system point with point attributes, and values for each point attribute. Common program element types and/or common attributes are matched with the mapping template files according to the mapping rules to generate at least one matching program element. The matching program element is converted into an automation system point configuration (system point configuration) which is stored in persistent storage of or accessible by the automation control system.

12 Claims, 15 Drawing Sheets

300

301 — PROVIDING A PROCESSOR THAT IMPLEMENTS POINT CONFIGURATION SOFTWARE STORED IN A MEMORY ASSOCIATED WITH THE PROCESSOR AND AT LEAST ONE AUTOMATION CONTROLLER PROGRAM FILE HAVING PROGRAM ELEMENTS AND PROGRAM ELEMENT ATTRIBUTES EXECUTABLE IN AN AUTOMATIC CONTROLLER OF THE AUTOMATION CONTROL SYSTEM. THE POINT CONFIGURATION SOFTWARE EXECUTES STEP 302-305.

302 — TRANSLATING AT LEAST AN EXTRACT OF THE AUTOMATION CONTROLLER PROGRAM FILE INTO A COMMON REPRESENTATION INCLUDING COMMON PROGRAM ELEMENT TYPES AND COMMON ATTRIBUTES FOR EACH OF THE COMMON PROGRAM ELEMENT TYPES.

303 — APPLYING MAPPING TEMPLATE FILES EACH INCLUDING MAPPING RULES AND MAPPING PARAMETERS DEFINING HOW THE PROGRAM ELEMENTS AND PROGRAM ELEMENT ATTRIBUTES ARE MAPPED INTO AT LEAST ONE AUTOMATION SYSTEM POINT WITH POINT ATTRIBUTES, AND VALUES FOR EACH POINT ATTRIBUTE.

304 — MATCHING THE COMMON PROGRAM ELEMENT TYPES AND/OR COMMON ATTRIBUTES WITH THE MAPPING TEMPLATE FILES USING THE MAPPING RULES TO GENERATE AT LEAST ONE MATCHING PROGRAM ELEMENT.

305 — CONVERTING THE MATCHING PROGRAM ELEMENT INTO AN AUTOMATION SYSTEM POINT CONFIGURATION (SYSTEM POINT CONFIGURATION).

306 — STORING THE SYSTEM POINT CONFIGURATION IN A PERSISTENT DATA STORAGE DEVICE OF OR ACCESSIBLE BY THE AUTOMATION CONTROL SYSTEM.

FIG. 3

```xml
<?xml version="1.0" encoding="UTF-8"?>
<PointGenerationTemplate Description="Honeywell PID Function Block" Integration="RTU2020" Version="1.0" Name="RTU2020_HWPID">
  <Matches>
    <Match Rule="HWPID" ProgramElement="FunctionBlock"/>
  </Matches>
  <Parameters>
    <Parameter Name="PointPrefix" DefaultValue="" Label="Point name prefix for all points created on this controller." Type="char"/>
    <Parameter Name="ScanPeriodFast" DefaultValue="2" Label="Scan period for PV/SP/OP." Type="int2"/>
    <Parameter Name="ScanPeriodSlow" DefaultValue="5" Label="Scan period for Auxiliaries." Type="INT"/>
  </Parameters>
  <SCADA_Items>
    <Item Name="Analog Point" Class="AnalogPoint">
      <Property id="ItemName">[%PointPrefix%][%#Property(Name)%]</Property>
      <Property id="AreaCode">[%#Controller(Asset)%]</Property>
      <Property id="SourceAddressSP">[%#Controller(Name)%][%#ConnectedProperty(SP,FullAddress)%]</Property>
      <Property id="SourceAddressPV">[%#Controller(Name)%][%#BlockProperty(HWDACA_1,AI,FullAddress)%].PV</Property>
      <Property id="SourceAddressOP">[%#Controller(Name)%][%#ConnectedProperty(OP,FullAddress)%]</Property>
      <Property id="SourceAddressMD">[%#Controller(Name)%][%#ConnectedProperty(MODE,FullAddress)%]</Property>
      <Property id="ScanningEnabled">True</Property>
      <Property id="ScanPeriodSP">[%ScanPeriodFast%]</Property>
      <Property id="ScanPeriodPV">[%ScanPeriodFast%]</Property>
      <Property id="ScanPeriodOP">[%ScanPeriodFast%]</Property>
      <Property id="ScanPeriodMD">[%ScanPeriodFast%]</Property>
      <Property id="RangeLow">[%#IOProperty(HWDACA_1,AI,EULow)%]</Property>
      <Property id="RangeHigh">[%#IOProperty(HWDACA_1,AI,EUHigh)%]</Property>
      <Property id="Units">[%#IOProperty(HWDACA_1,AI,EUDesc)%]</Property>
      <Property id="DestinationAddressSP">[%#Controller(Name)%][%#ConnectedProperty(SP,FullAddress)%]</Property>
      <Property id="DestinationAddressOP">[%#Controller(Name)%][%#ConnectedProperty(OP,FullAddress)%]</Property>
      <Property id="DestinationAddressMD">[%#Controller(Name)%][%#ConnectedProperty(MODE,FullAddress)%]</Property>
      <Property id="AuxiliaryNameA1">k</Property>
      <Property id="AuxiliaryNameA2">T1</Property>
      <Property id="AuxiliaryNameA3">T2</Property>
      <Property id="AuxiliaryNameA4">DB</Property>
      <Property id="SourceAddressA1">[%#Controller(Name)%][%#ConnectedProperty(K,FullAddress)%]</Property>
      <Property id="SourceAddressA2">[%#Controller(Name)%][%#ConnectedProperty(T1,FullAddress)%]</Property>
      <Property id="SourceAddressA3">[%#Controller(Name)%][%#ConnectedProperty(T2,FullAddress)%]</Property>
      <Property id="SourceAddressA4">[%#Controller(Name)%][%#ConnectedProperty(DB,FullAddress)%]</Property>
      <Property id="DestinationAddressA1">[%#Controller(Name)%][%#ConnectedProperty(K,FullAddress)%]</Property>
      <Property id="DestinationAddressA2">[%#Controller(Name)%][%#ConnectedProperty(T1,FullAddress)%]</Property>
      <Property id="DestinationAddressA3">[%#Controller(Name)%][%#ConnectedProperty(T2,FullAddress)%]</Property>
      <Property id="DestinationAddressA4">[%#Controller(Name)%][%#ConnectedProperty(DB,FullAddress)%]</Property>
      <Property id="ScanPeriodA1">[%ScanPeriodSlow%]</Property>
      <Property id="ScanPeriodA2">[%ScanPeriodSlow%]</Property>
      <Property id="ScanPeriodA3">[%ScanPeriodSlow%]</Property>
      <Property id="ScanPeriodA4">[%ScanPeriodSlow%]</Property>
      <Property id="HistoryParameters" ParamName="PV">
        <Property id="FastSelected">True</Property>
        <Property id="FastCollecttionRate">1</Property>
        <Property id="FastOffset">0</Property>
        <Property id="StdSelected">True</Property>
        <Property id="StdCollectionRate">60</Property>
        <Property id="StdOffset">0</Property>
        <Property id="FastSelected">True</Property>
        <Property id="FastCollectionRate">1</Property>
        <Property id="FastOffset">0</Property>
        <Property id="StdSelected">True</Property>
        <Property id="StdCollectionRate">60</Property>
        <Property id="StdOffset">0</Property>
        <Property id="Paramname">SP</Property>
        <Property id="StdSelected">True</Property>
        <Property id="StdCollectionRate">60</Property>
        <Property id="StdOffset">0</Property>
    </Item>
  </SCADA_Items>
</PointGenerationTemplate>
```

FIG. 7

| Controller Integration Mapping Navigat... ⊘ ⊠ |
|---|

- Controller Integration Mapping (RTU2020_HWP
  - Matches
  - Parameters
  - Points

| Configuration Explorer | Controller Integration Mapping Builder(RTU2020_HWPID) |

Mapping Parameters

| Name | Type | Label | Default Value |
|---|---|---|---|
| PointPrefix | char | > Point name prefix for all points cr... | |
| ScanPeriodFast | int2 | > Scan period for PV/SP/OP. | 2 |
| ScanPeriodSlow | | > Scan period for Auxiliaries. | 5 |

| Controller Integration Mapping Navigat... 🔍 ✕ | | | |
|---|---|---|---|
| 🗎 Controller Integration Mapping (RTU2020_HWP | | | |
| ├─ Matches | | | |
| ├─ Parameters | | | |
| └─ Points | | | |

| 🗀 Configuration Explorer  🗎 Controller Integration Mapping Builder(RTU2020_HWPID) | |
|---|---|
| Points | Display: All ▾  🗗 + 🗂 |

| Name | Class |
|---|---|
| Analog Point | AnalogPoint |

Property Details

| | |
|---|---|
| › General | |
| Name | Analog Point |
| Class | Analog Point |
| › Advanced | |
| ∨ Main | |
| ItemName | [%PointPrefix%.%][%#Property(Name)%] |
| AreaCode | [%Controller(Asset)%] |
| ∨ SourceAddress | |
| SourceAddressSP | [%Controller(Name)%] [%#ConnectedProperty(SP,FullAddress)%] |
| SourceAddressPV | [%Controller(Name)%] [%#BlockProperty(HWDACA_1_AI,FullAddress)%] |
| SourceAddressOP | [%Controller(Name)%] [%#ConnectedProperty(OP,FullAddress)%] |
| SourceAddressMD | [%Controller(Name)%] [%#ConnectedProperty(MODE,FullAddress)%] |
| DestinationAddressOP | [%Controller(Name)%] [%#ConnectedProperty(OP,FullAddress)%] |
| DestinationAddressMD | [%Controller(Name)%] [%#ConnectedProperty(MODE,FullAddress)%] |
| SourceAddressA1 | [%Controller(Name)%] [%#ConnectedProperty(K,FullAddress)%] |
| SourceAddressA2 | [%Controller(Name)%] [%#ConnectedProperty(T1,FullAddress)%] |
| SourceAddressA3 | [%Controller(Name)%] [%#ConnectedProperty(T2,FullAddress)%] |
| SourceAddressA3 | [%Controller(Name)%] [%#ConnectedProperty(DB,FullAddress)%] |
| › HistoryParameters0 | |
| › HistoryParameters1 | |
| › HistoryParameters2 | |

| Configuration Explorer | Controller Integration Mapping Building(RT2020_HWPID) | AS01HSCVICA - QuickBuilder |
|---|---|---|

Controller Integration

- AS01HSCVICA
  - Controllers
  - Mappings
  - Global Parameters
  - Recycle Bin

| Controllers | Project Path |
|---|---|
| CONDNPO | C:\temp\RTU2020_PROJECTS\export_from_RTUBuilder.ZIP |

Generate Points for this Controller

Controller CONDNPO Controller Type DNP3 Protocol Controller Channel OAKCH01 Asset
Project Path C:\temp\RTU2020_PROJECTS\export_from_RTUBUILDER.ZIP

[Select Mappings] [Generate Points]

Select points to generate by modifying the action column.

| Controller Data | | Mapping Data | Point Data | | |
|---|---|---|---|---|---|
| Variable Name | Data Type | Matched Mapping | Point Name | Action | Status |
| Tst_13.START | UINT | RTU2020_ANALOG_INT | START | GENERATE | |
| Tst_13.ENABLE | BOOL | RTU2020STATUS | ENABLE | GENERATE | |
| Tst_13.SEND | BOOL | RTU2020STATUS | SEND | GENERATE | |
| Tst_12.SAFEOP | INT | RTU2020_ANALOG_INT | SAFEOP | GENERATE | |
| Tst_12.FR | BOOL | RTU2020STATUS | FR | GENERATE | |
| Tst_12.FS | BOOL | RTU2020STATUS | FS | GENERATE | |
| Tst_12.RDY | BOOL | RTU2020STATUS | RDY | GENERATE | |
| Tst_12.XYFL | BOOL | RTU2020STATUS | XYFL | GENERATE | |
| Tst_12.XYRL | BOOL | RTU2020STATUS | XYRL | GENERATE | |
| Tst_12.ZSF1 | BOOL | RTU2020STATUS | ZSF1 | GENERATE | |
| Tst_12.ZSF2 | BOOL | RTU2020STATUS | ZSR2 | GENERATE | |
| Tst_12.ZSR1 | BOOL | RTU2020STATUS | ZSR1 | GENERATE | |
| Tst_12.ZSR2 | BOOL | RTU2020STATUS | ZSR2 | GENERATE | |
| Tst_17.FIC100 | FUNCTION BLOCK | RTU2020_HWPID | FIC100 | GENERATE | |
| Tst_17.API_BT | LREAL | RTU2020_ANALOG_REAL API_BT | API_BT | GENERATE | |
| Tst_17.API_OP | LREAL | RTU2020_ANALOG_REAL API_OP | API_OP | GENERATE | |
| Tst_17.API_OT | LREAL | RTU2020_ANALOG_REAL API_OT | API_OT | GENERATE | |
| Tst_15.HWPID_1 | FUNCTION BLOCK | RTU2020_HWPID | HWPID_1 | GENERATE | |
| Tst_15.HWPID_2 | FUNCTION BLOCK | RTU2020_HWPID | HWPID_2 | GENERATE | |
| Tst_15.HWPID_3 | FUNCTION BLOCK | RTU2020_HWPID | HWPID_3 | GENERATE | |

*FIG. 10*

| Point Comparison | | | |
|---|---|---|---|
| Point in Quick Builder database | | Point in generate based on mappings | |
| ▲ FIC100 | | ▲ FIC100 | |
| ScanPeriodMD | 1 | ScanPeriodMD | 2 |
| ScanPeriodOP | 1 | ScanPeriodOP | 2 |
| ScanPeriodPV | 1 | ScanPeriodPV | 2 |
| ScanPeriodSP | 1 | ScanPeriodSP | 2 |
| ▲ HWPID_1 | | ▲ HWPID_1 | |
| ScanPeriodMD | 1 | ScanPeriodMD | 2 |
| ScanPeriodOP | 1 | ScanPeriodOP | 2 |
| ScanPeriodPV | 1 | ScanPeriodPV | 2 |
| ScanPeriodSP | 1 | ScanPeriodSP | 2 |
| ▲ HWPID_2 | | ▲ HWPID_2 | |
| ScanPeriodMD | 1 | ScanPeriodMD | 2 |
| ScanPeriodOP | 1 | ScanPeriodOP | 2 |
| ScanPeriodPV | 1 | ScanPeriodPV | 2 |
| ScanPeriodSP | 1 | ScanPeriodSP | 2 |
| ▲ HWPID_3 | | ▲ HWPID_3 | |
| ScanPeriodMD | 1 | ScanPeriodMD | 2 |
| ScanPeriodOP | 1 | ScanPeriodOP | 2 |
| ScanPeriodPV | 1 | ScanPeriodPV | 2 |
| ScanPeriodSP | 1 | ScanPeriodSP | 2 |
| ▲ HWPID_4 | | ▲ HWPID_4 | |
| ScanPeriodMD | 1 | ScanPeriodMD | 2 |
| ScanPeriodOP | 1 | ScanPeriodOP | 2 |
| ScanPeriodPV | 1 | ScanPeriodPV | 2 |
| ScanPeriodSP | 1 | ScanPeriodSP | 2 |
| ▲ HWPID_5 | | ▲ HWPID_5 | |
| ScanPeriodMD | 1 | ScanPeriodMD | 2 |
| ScanPeriodOP | 1 | ScanPeriodOP | 2 |
| ScanPeriodPV | 1 | ScanPeriodPV | 2 |
| Modified  Added | | | |

*FIG. 11*

AUTOMATION CONTROL SYSTEM POINT CONFIGURATION FROM CONTROLLER PROGRAM FILES

FIELD

Disclosed embodiments relate to information management and processing of data associated with industrial automation control systems.

BACKGROUND

Process control systems, whether distributed control system (DCS) or supervisory control and data acquisition (SCADA) systems, generally include one or more process controllers communicatively coupled to at least one host (e.g., an operator workstation) and to one or more process control devices (e.g., field devices) configured to communicate via analog, digital or combined analog/digital communication signals and/or protocols. Such process control systems are commonly used in chemical, pharmaceutical, pulp and paper manufacturing and petroleum processes. The field devices can comprise device controllers, valves, valve actuators or positioners, switches, transmitters (e.g., temperature, pressure, flow rate, or chemical composition sensors), performing functions within the process control system such as opening and/or closing valves and measuring process parameters. The process controller receives signals indicative of process measurements made by the field devices and/or other information pertaining to the field devices, uses this information to implement a control routine, and generates control signals over buses and/or other communication lines to the field devices to control the operation of the process control system.

Modern industrial automation control systems manage and process real-time and/or essentially real-time information in the form of point data. In such control systems, a "tag" represents a structural data element comprising point data associated with various components (such as physical device components) of the system. Quite often the tag will be to reference derived or calculated values in the system, specific operator entered values/commands/requests, data associated with control strategy logic, or other logical entities such as timers. The point data of selected tags are made accessible to other components, systems, applications and/or users in the control systems in various combinations.

Generally, point data is subject to frequent change and may be monitored and reported through various operations and functions. Non-point data relates to a broad category of information that contextualizes point data in a variety of ways. Non-point data may include descriptive and/or attribute information characterizing the point data, as well as, other information such as limits, and ranges. In conventional control systems, integral and flexible manipulation of tag-based point data and non-point data is restricted due to their inherent differences and properties.

Modern industrial automation control systems, whether they are distributed control system (DCS) or supervisory control and data acquisition (SCADA) systems, are needed to provide plant operators with view and control of processes by interfacing with a variety of automation controllers using a range of different industrial communication protocols. The lifecycle of the industrial automation control system includes design, implementation, acceptance testing (at factory and/or on site), commissioning, and then maintenance during the operating life of the control system.

Traditional execution of the engineering of the automation control system throughout this lifecycle involves automation engineers programming a control strategy that is executed in an electronic automation controller (e.g. a programmable logic controller (PLC) or remote terminal unit (RTU)). Each register, or interfacing data point, or a collection of such data points, is then separately configured in the DCS or SCADA system as a 'point' in the automation system. Points fall into two major categories based on data type. Analog points are characterized by having real values that can be represented by the IEEE floating point numerical format. Status points are characterized by having discrete values in at least two states, the two sates being represented by a zero or a one. For accurate information to be presented to the user of the automation control system it is necessary that attributes of the point configuration such as the address for the value being acquired, the engineering units for the value and its range or state descriptors, are aligned with those assumed and configured in the control strategy being used in the automation controller. Being aligned is not necessarily exactly the same, as there may be some subtle syntax translations required, particularly for addressing where the syntax of the address in the automation controller may be slightly different from the syntax that is used in the automation control system.

During the life cycle of the automation control system, when alterations are made to the control strategy in the automation controller, the alignment of the automation system point configuration with the control strategy (including modified, added or removed points) is often a manual and time consuming task. This task requires the identification of changes in the program, manual alignment of the automation system configuration, and then subsequent verification and testing of the associated change in the automation system configuration.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include automating with a software-based solution the otherwise conventional manual changes needed to the automation system configuration when any alteration is made to the control strategy reflected in controller program files used by the automation controller. Disclosed solutions reduce the time for identifying, configuring and verifying the automation system configuration when changes are made to the control strategy.

One disclosed embodiment comprises a method of configuring automation control systems using point configuration software. A control strategy program for an automatic controller of the automation system including at least an extract from automation controller program file(s) having program elements and program elements attributes executable in an automatic controller is translated into a common representation including common program elements types and common attributes for each of the common program element types. Mapping template files are applied each including mapping rules and mapping parameters defining how the program elements and attributes are mapped into at least one automation system point with point attributes, and values for each point attribute. Common program elements and/or common attributes are matched with the mapping template files according to the mapping rules to generate at least one matching program element. The matching program element is converted into an automation system point configuration (system point configuration), which is stored in a persistent storage device of or accessible by the automation control system for use in operating the process run by the control system.

BRIEF DESCRIPTION OF THE DRAWINGS

FIG. 3 is a flow chart that shows steps in an example method of configuring an automation control system, according to an example embodiment.

FIG. 7 is a visual representation that shows an example mapping template file in an Extensible Markup Language (XML structured text document), according to an example embodiment.

FIGS. 8A, 8B, 8C and 8D are graphical representations of a mapping template file in the user interface that users can use as a user friendly editor to create and edit mapping template files rather than working directly in the raw text file shown in FIG. 7, according to an example embodiment.

FIG. 10 is a visual representation of a user Interface for selecting which mapping is to be applied, according to an example embodiment.

FIG. 11 is a visual representation of a sample verification process output (output by the verification report) titled "compare points" that shows the differences between the desired point configuration and the current point configuration in the point database, according to an example embodiment.

DETAILED DESCRIPTION

Figure 1:
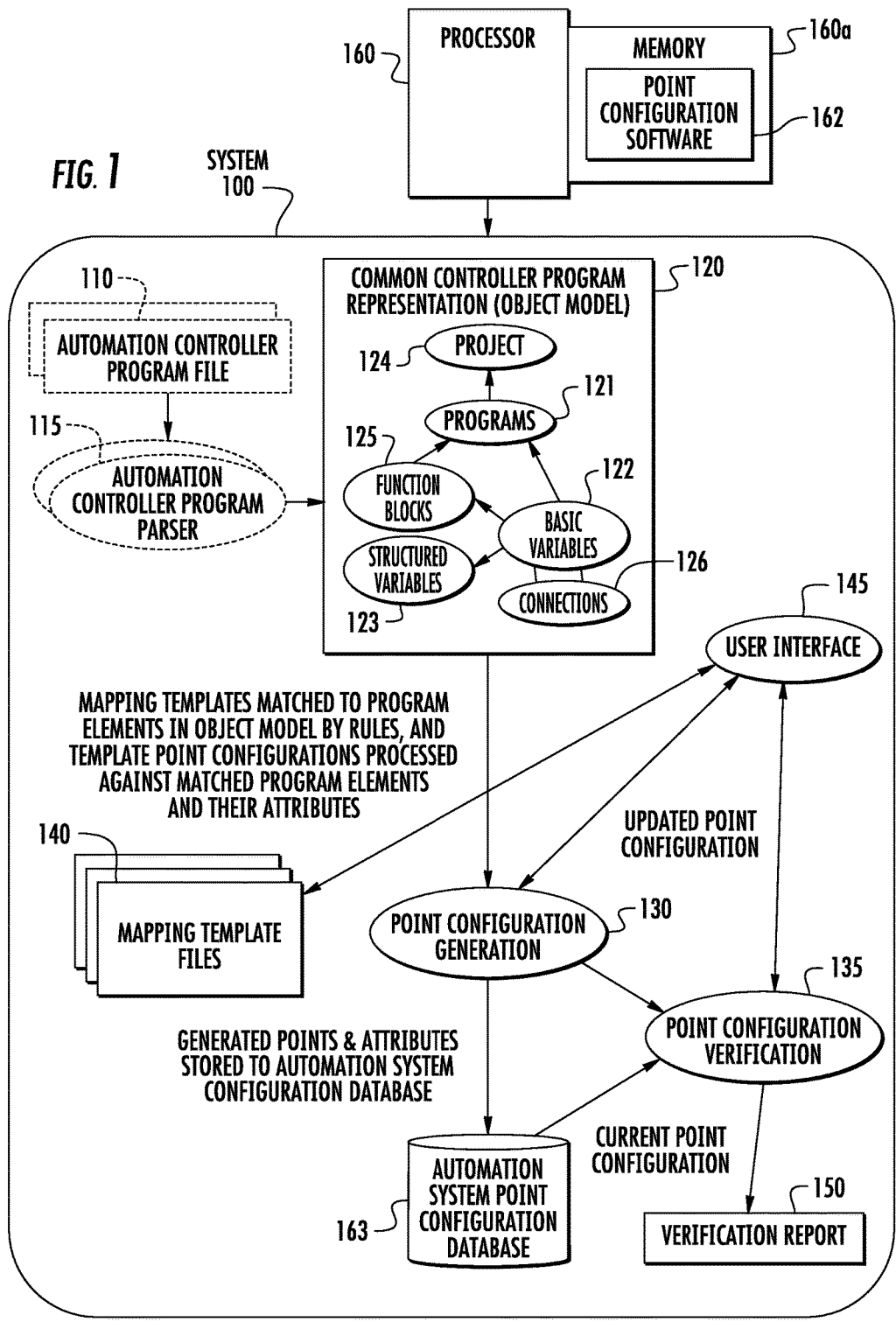
FIG. 1 shows an example point configuration system configured to run on a processor of a computing device such as a personal computer (PC)/server that is in communication with an automation controller, with the point configuration system shown as component blocks, with arrows provided indicating data flow and interaction between respective system components, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed point configuration software systems (point configuration systems) meet the needs of industrial automation system users by providing a software-based system and related method to create, align and validate the automation control system point configuration, including the attributes of those points. Disclosed point configuration systems run on a processor of a computing device such as a personal computer (PC)/server that is in communication with an automation controller (e.g., based on programmable logic controller (PLC) or remote terminal unit (RTU) hardware). Disclosed point configuration systems can be included with a variety of different automatic process controllers (automation controllers). The point configuration system analyses the control strategy program input, and applies mappings (described below using mapping template files 140) which define the translation of the program elements and their attributes discovered through analysis of the control strategy from the controller program files.

The mappings in the mapping template files may be shipped with the automation system or the automation controller, be generated from the program files (see controller program file(s) 110 in FIG. 1 described below) or obtained by a parser (see parser 115 in FIG. 1 described below). The disclosed point configuration system then creates, deletes, or modifies the automation system point configuration so that it accurately acquires and presents the values and other associated attributes that indicate the state of the industrial process. The output may be in the form of a tabular summary, but typically the values and attributes including acquired data are used to drive visualizations of the plant process that the automation system is controlling.

FIG. 1 shows an example point configuration system 100 configured to run on a processor 160 of a computing device, such as the point configuration and communications node computers 245*a*, 245*b* shown in FIG. 2 (showing an automation control system 200) described below, according to an example embodiment. The processor 160 implements point configuration software 162 stored in a database in a memory 160*a* associated with the processor 160. The point configuration system 100 is shown implemented as component blocks, with arrows provided indicating data flow and interaction between respective components of point configuration system 100. When the point configuration software 162 is run by the processor 160 it is not required for the point configuration and communications node computers 245*a*, 245*b* to be in communication with the automation controller (see DCS controller 230 and PLC or RTU controller 240 in FIG. 2 described below).

The automation controller programs 110 may be stored in the memory 160a. These program files 110 describe the control strategy or program executing in the automation controller, which may include for example digital or analog valve control strategies or process parameter value monitoring strategies. The format of the controller program files 110 may be standardized for this purpose, such as the open standard PLC Open XML format for control strategies which utilize the IEC61131-3 standardized programming languages, or may be in a proprietary format. These controller program files 110 may be obtained from the software package that is used to program the automation controller (e.g., DCS controller 230 or PLC or RTU controller 240 in FIG. 2), or be obtained directly from the automation controller via a communication protocol.

The point configuration system 100 may also process only an extract (a portion of the controller program files 110 as some of the control strategy logic may not be required and/or not available. In some cases there may also be intellectual property protection around control strategy implementations in which case the point configuration system 100 may need to work only on tag data and no control logic. The ability to process only extracts of the automation controller program files 110 can thus be important to protect intellectual property that may be in the control strategy files if there are different companies (potentially competitors) working on the controller strategy and the automation system.

The point configuration system 100 includes an automation controller program parser (parser) 115. Parser 115 is a software processing component that parses and analyses the files from the controller program files 110. The analysis of controller program files 110 provided by parser 115 creates an abstract representation of the files. "Abstract" in this context means a representation of software objects in memory, database or a file that models the important program elements, relationships and attributes in the controller program file in such a way that a common set of software objects can be used regardless of the type of controller program file that is provided. The set is also chosen to model only the important program elements, relationships and attributes that are needed for the configuration point system 100 to keep aligned.

Each element of the controller program files 110 such as registers or variables, structured data type definitions and function block instances, and their attributes such as description, range, and extended attributes, are mapped by the parser 115 into a common representation 120 shown as a "common controller program representation (object model)". The common representation may be stored in memory, a database or a file, such as in memory 160a. Common program element types include, but are not limited to, entities such as programs 121 (which may be referred to as tasks), basic variables 122, structured variables 123, array variables and data type definitions for each (not shown), and each common program element type has attributes which may include the name, description, addressing information, state descriptors, ranges and engineering units. The relationships between the common program representation element types are also maintained in the common representation 120. Different parser components may be utilized for different controller program file formats.

Regarding the project 124 and function blocks 125 shown in the common representation 120 in FIG. 1, these are examples of generalized program element types. The connections 126 is not considered as a type of element, as it is a representation of a relationship between two elements, not a type of element itself in the controller program in the controller program files 110. The top level is the project 124 which encompasses the entire control strategy. Within the project 124 there may be a number of programs 121 executing the control strategy (as noted above programs 121 may also be referred to as tasks). Each program 121 executes a part of the overall control strategy either continuously, on specific conditions or events, or at specified times. The actual logic that is executed within the control strategy is defined with variables which may be a basic type (such as a simple integer or floating point value) or a structure comprising a group of basic variables and/or more structured variables, and it is this connection which is one way of representing this containment within structures. The function blocks 125 execute dedicated parts of the control strategy and are typically a grouping of variables and executing logic. Each program representation element types 121-125 is connected by connections 126 to execute the overall control strategy so the lines between the respective elements represent the connections and relationships which are significant when ensuring correct addressing for any given program element in the point configuration.

The point configuration system 100 also includes mapping template files 140. Mapping template files 140 comprise a file(s) which may be provided with the automation control system or the controller, such as DCS controller 230 or RTU or DCS controller 240 in FIG. 2, or may be configured by the user of the system, such as by using the user interface 145. Mapping template files 140 defines how the program elements and their attributes, along with other user defined content and parameterized values are mapped into at least one automation system point. The mapping template file 140 also defines what values each attribute of that point is needed to have to ensure an accurate representation in the automation system. The mapping template file 140 also has rules which determine the instances of program elements that are compatible with that mapping template (e.g., apply only to instances of a function block of the type 'PID').

The parameters which the user enters when the point configuration system 100 is executed are also defined to provide a mechanism to customize some attribute values for each execution of the point generation or alignment. Essentially there is attributes of the points which cannot be derived from the program elements, and sometimes these attributes may need specific values across many points on an automation controller, or across a whole automation control system. An example is the period of time at which a point value may be requested from an automation controller, this may be common across all points on a controller. These parameters are user entered values that can be provided per automation controller or automation control system to set attribute values of the generated points without having to edit the mapping template files 140.

The point configuration system 100 also includes a point configuration generation component 130. The point configuration generation component 130 processes all the common program element types 121-125 in the common representation 120 and matches them against mapping template files 140 according to the rules defined in each mapping template file. All matching program element(s) can optionally be presented to the user, who then can use a user interface 145 to complete the configuration for those common program element types 121-125, and resolves any cases where multiple mapping templates match the same common program element type 121-125. Those elements the user then chooses to process are converted into the automation system point configuration, ensuring all attributes of the point derived from the mapping template 140, user specified parameters, and program element properties and relationships are aligned.

The point configuration system 100 also includes point configuration verification component 135. The point configuration verification process recreates the point configuration from the (possibly modified) controller program file 110, applying and processing the (possibly modified) mapping definitions, and then comparing that against the (possibly externally modified) existing automation system point configuration. This point configuration verification process provided by point configuration verification component 135 reuses the same controller program files 110, although in this case it may simply be a modified version of a previously processed program file. The parser 115, common representation 120, mapping template files 140 and point configuration generation component 130 are all reused in this case, but the results of this point configuration generation component 130 are not sent to the system point configuration database (point database) 163, they are instead passed to the point configuration verification component 135 to be compared against what is in the point configuration database (comparing point database 163 vs point configuration verification component 135), and the verification report 150 comprising a report of the differences, which when provided to the user allows the user to identify any misalignment. The user can optionally apply the updated point configuration provided by the point configuration generation component 130 to the point configuration system 100 to ensure it is aligned with the control strategy in the controller program file 110.

The automation point database 163 is generally stored in some database supported by memory 160a. Along with storage of the automation system point configuration, this persistent data storage also stores the decisions made and parameter values entered by the user (e.g. if a program element should be translated into a point). This allows disclosed point configuration system 100 software and methods to be run repeatedly with users only needing to make choices or enter data for new or deleted program elements.

Figure 2:
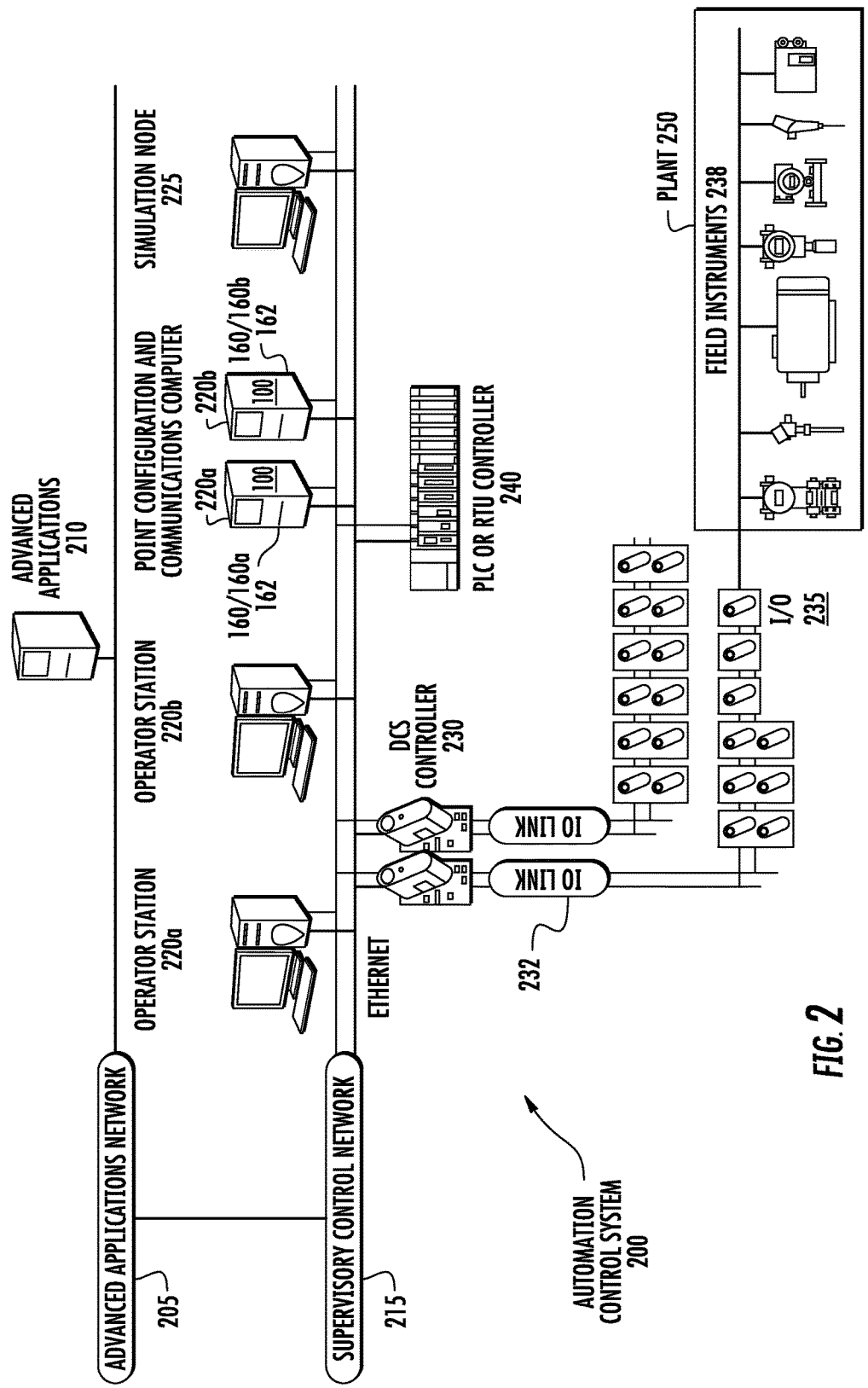
FIG. 2 shows disclosed point configuration systems within an example industrial automation control system that comprises at least one automation controller interfaced to control operations at a plant, according to an example embodiment.

FIG. 2 shows disclosed point configuration systems 100 within an example industrial automation control system 200 that comprises at least one automation controller interfaced to control operations at a plant 250. The DCS controller 230 and PLC or RTU Controller 240 are both examples of automation controllers in the automation control system 200 that execute control strategies defined by automation controller program file(s) 110.

Automation control system 200 includes an advanced applications network 205 including an advanced applications station 210 and a supervisory control network 215 shown as an Ethernet network. The supervisory control network 215 includes operator stations 220a, 220b, a simulation node 225, the DCS controller 230, input/outputs (IOs) 235, and the PLC or RTU controller 240.

The supervisory control network 215 also includes at least one point configuration and communications node having a disclosed point configuration system 100 shown with optional redundancy (2 point configuration systems) provided by point configuration and communications node computers 245a, 245b each having a processor 160/memory 160a and point configuration software 162 stored in the memory 160a. The DCS controller 230 is coupled by IO links 232 to the IOs 235 which couple to the field instruments 238 within the plant 250. It is noted that in an actual system the PLC or RTU controller 240 is also connected to the field instruments 238 in the plant 250 through I/O links 232 and I/Os 235, although typically through different IO links, I/O and instruments to those controlled by a DCS controller 230. This aspect would be known to those who have ordinary skill in the art of automation control systems.

The system point configuration can typically be accessed from several different nodes of the automation control system 200, including the operator stations 220a, 220b and point configuration and communications computers 245a, 245b. The operator stations 220a, 220b typically access the system point configuration to review and edit the system point configuration, while the point configuration and communications computers 245a, 245b typically use the system point configuration for working out how to obtain real time data from the automation controller, and also to translate and format the presentation of that real time data which is sent to the operator stations for display to users. The system point configuration may be used as an interface to the automatic controller (230 and/or 240) while running the industrial process to define real-time processing performed by the automation control system to present real-time data generated.

FIG. 3 is a flow chart that shows steps in an example method 300 of configuring an automation control system, according to an example embodiment. Step 301 comprises providing a processor 160 that implements point configuration software 162 stored in a memory 160a associated with the processor and at least one automation controller program file 110 having program elements and program element attributes executable in an automatic controller (230 and/or 240) of the automation control system 200. The point configuration software implements steps 302-307 described below.

Step 302 comprises translating at least an extract of the automation controller program file 110 into a common representation 120 including common program element types and common attributes for each of the common program element types. The common representation 120 can comprise an object model representation. Step 303 comprises applying mapping template files 140 each including mapping rules and mapping parameters defining how the program elements and program element attributes are mapped into at least one automation system point with point attributes, and values for each point attribute.

Step 304 comprises matching at least one of the common program element types and common attributes with the mapping template files 140 using the mapping rules to generate at least one matching program element. Step 305 comprises converting the matching program element into an automation system point configuration (system point configuration). Step 306 comprises storing the system point configuration in a persistent data storage device of or accessible by the automation system, such as a file, database or other persistent storage. As known in the art, the point configuration is needed for the ongoing purpose of the industrial automation system (e.g., manufacturing a product, or refining).

After step 306 an optional step can comprise validating or comparing the point configuration currently in the point database 163 with that which will be generated by point configuration generation component 130 and present the comparison results to the user in the user interface 145. This step uses the verification component 135.

The method can further comprise using the system point configuration as an interface to the automatic controller while running an industrial process to define real-time processing performed by the automation system to present real-time data generated in the automation controller. The matching program element can also be presented to a user to complete a configuration for the matching common program element. Completing a configuration involves a user entering any automation system point attributes which are not expected to have default values and the value cannot be derived from the automation controller file. This may include for example some assignment of the point to a specific plant area, or including some reference to a drawing or document related to the system point.

A parser 115 can parse a program file 110 into the common representation 120 to assist in extending support to a new type of automation controller where each automation controller type has its own way of defining its program. So the common representation 120 means support for a new type of controller only needing a parser 115 to convert from the program file 110 to the common representation 120. After the point generation, mapping, verification and user interface work on the common representation. The support is thus that only a single component needs to be provided to support the point generation system 100 for a new automation controller type.

A specified set of parameters supplied by the user (such as Point name prefix or real time data collection rate) can be used to employ the mapping template files 140 across different ones of a same type of automation systems. For example, the for same type of automation system the same mapping file 140 can be used, such as on two EXPERION Systems, even though the customer may need different scan rate configuration for the points. In this way the same mapping file can be used on each EXPERION system without modification, and the user just provides the scan rate configuration they need in each case. Accordingly, modification of the mapping template files 140, the user can specify values for the point attributes for each different automation system.

The modified ones of mapping template files 140 or modified ones controller program files 110 can be used to provide a new system point configuration that is an aligned configuration in the point database 163. This does not require any verification process, the user can just rerun the method and the point configuration will be updated (attributes modified, points added and deleted as required for alignment). The verification process to view the comparison is thus optional.

Some point attributes for a given point in the system point configuration database 163 can be modified outside the method by the user or by some other software outside the point configuration system 100. In these cases the method will ensure alignment when it is executed if that attribute is defined in the mapping template files 140. Other features include the mapping template files 140 can provide a mechanism for the user to select attributes of the matched program element, or attributes of program elements that are connected or related to the matched program element, and also complete additional processing (for example regular expression matching and grouping) on the attributes obtained.

Believed to be unique features for disclosed point configuration systems 100 include translation of the controller program file(s) 110 (or an extract thereof) into a common representation that is stored in a memory (point database 163). This allows the automation system to be enhanced easily to support additional automation controller vendors, program languages, or program formats, by providing a parser module 115, and only minimal changes to other components of the solution such as exposing the new controller type in the user interface 145.

Another new feature is utilizing a mapping template (from mapping template file 140) to define the automation system point(s). The mapping template can be configured by the user or as noted above may be provided with the automation control system 200, or with the automation controller(s) 230,240, or may be generated as an output from the parser 115. This mapping template file 140 allows for properties of each point to be defined from static configuration in the mapping template file 140, data queried or derived through additional processing from the common representation 120 using queries. Data (parameter values) defined by the user are used when executing disclosed methods. This provides a mechanism to re-use mapping templates across different automation systems that may have different conventions or requirements, without modifying the mapping templates.

Any combination of above can be used for the value for any attribute of the point(s). An instance of the mapping template can itself also be derived from data in the control program, for example structured data types can be mapped directly to similar structured points in the automation system, without requiring user configuration of the mapping template 140. Each program element in the control strategy can be used to create one or more points in the automation system.

The point configuration system 100 can generate a new version of the point configuration, and compare the new point configuration version against the current point configuration in the automation control system 200. This comparison may be against the online or an offline automation system configuration. Any additional, removed, or modified points and modified point attributes can be reported in a verification report 150.

Disclosed embodiments can be applied to generally to any industrial process control system. Examples include chemical, pharmaceutical, pulp and paper manufacturing and petroleum plants.

EXAMPLES

Disclosed embodiments are further illustrated by the following specific Examples, which should not be construed as limiting the scope or content of this Disclosure in any way.

Figure 4:
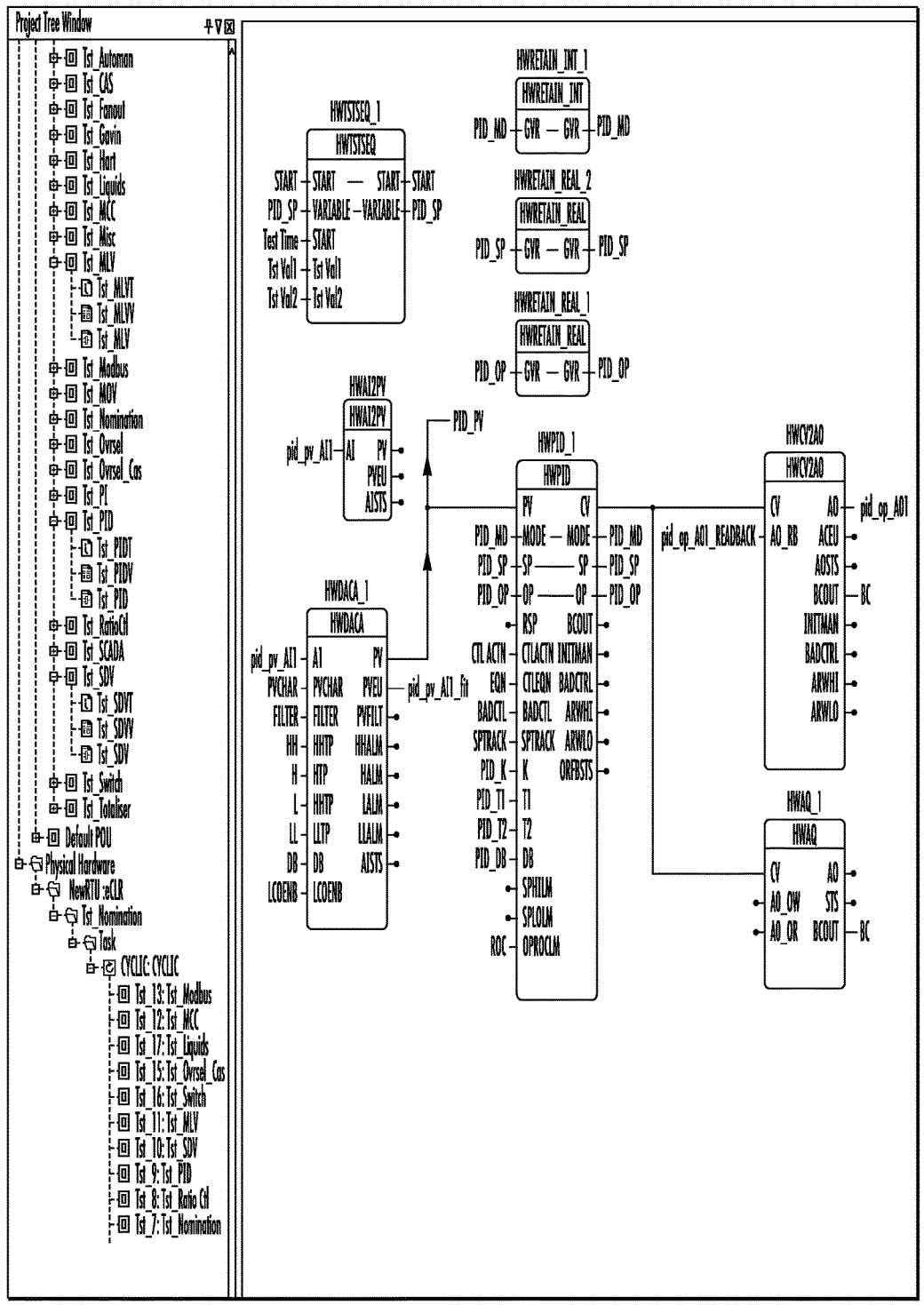
FIG. 4 is a visual representation of an example automation controller program file being for a RTU2020 sample controller appearing in the user interface of the automation controller configuration software, according to an example embodiment.
Figure 5:
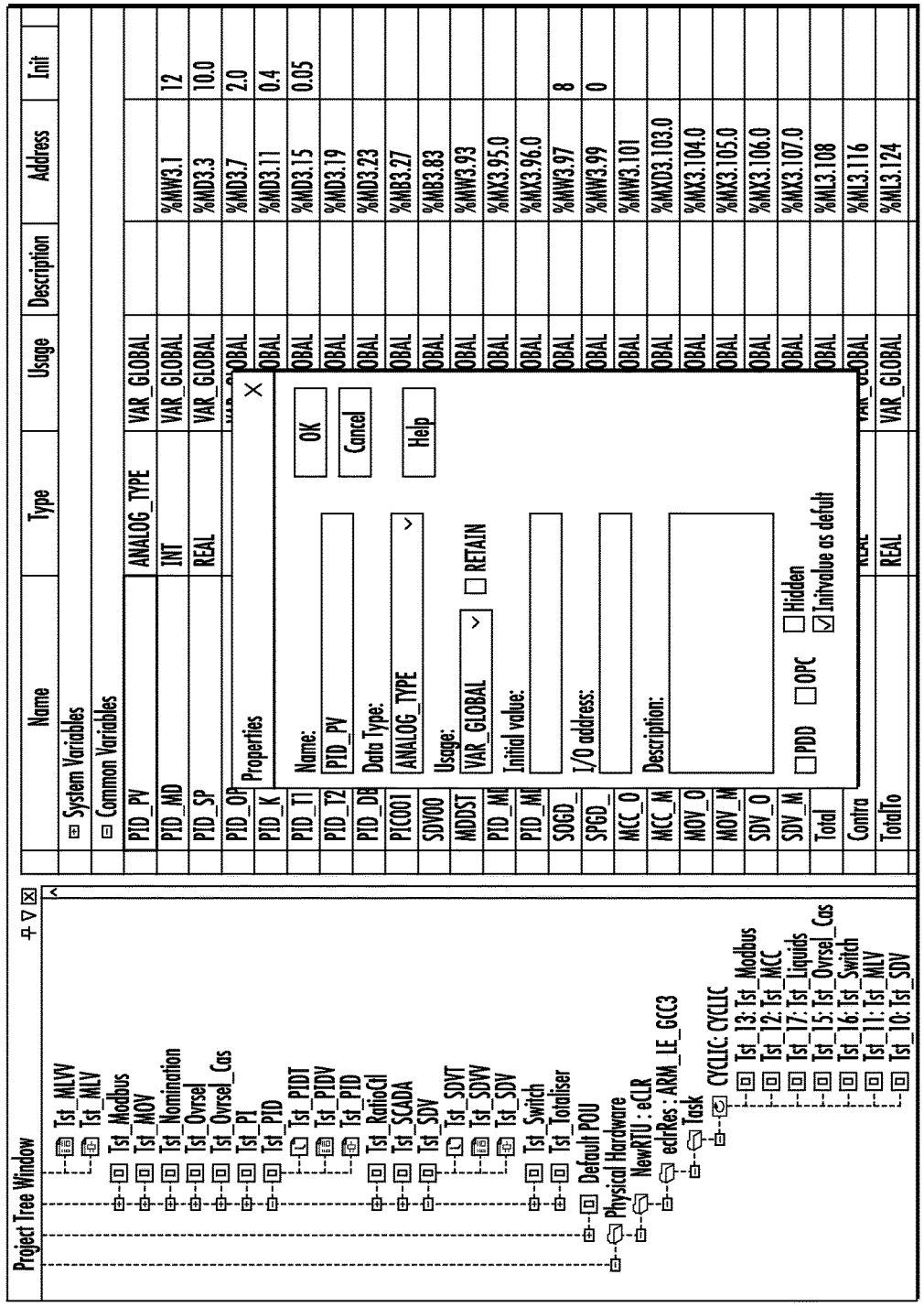
FIG. 5 is a visual representation showing more details regarding the 'variable' type program elements in the program file showing a list in the background, and program element attributes of the variable type program elements, according to an example embodiment.

FIG. 4 is a visual representation of an example automation controller program file 110 being for a RTU2020 sample controller (representing the PLC or RTU controller 240 in FIG. 2) which shows visualization of the program elements of the program file 110 as they are presented in the configuration software for the automation controller appearing in the user interface 145. The visual representation shows some sample program elements including 'programs' in the project tree window on the left and function blocks which are shown as rectangular blocks in the middle. The function blocks are related to variables which are the text labels pinned to the blocks, or directly to each other with the lines drawn between the blocks. FIG. 5 is a visualization showing more details regarding the 'variable' type program elements in the program file 110 showing a list in the background, and program element attributes of the variable type program elements such as 'Name' 'Data Type', 'Initial Value', IO address, and Description.

Figure 6:
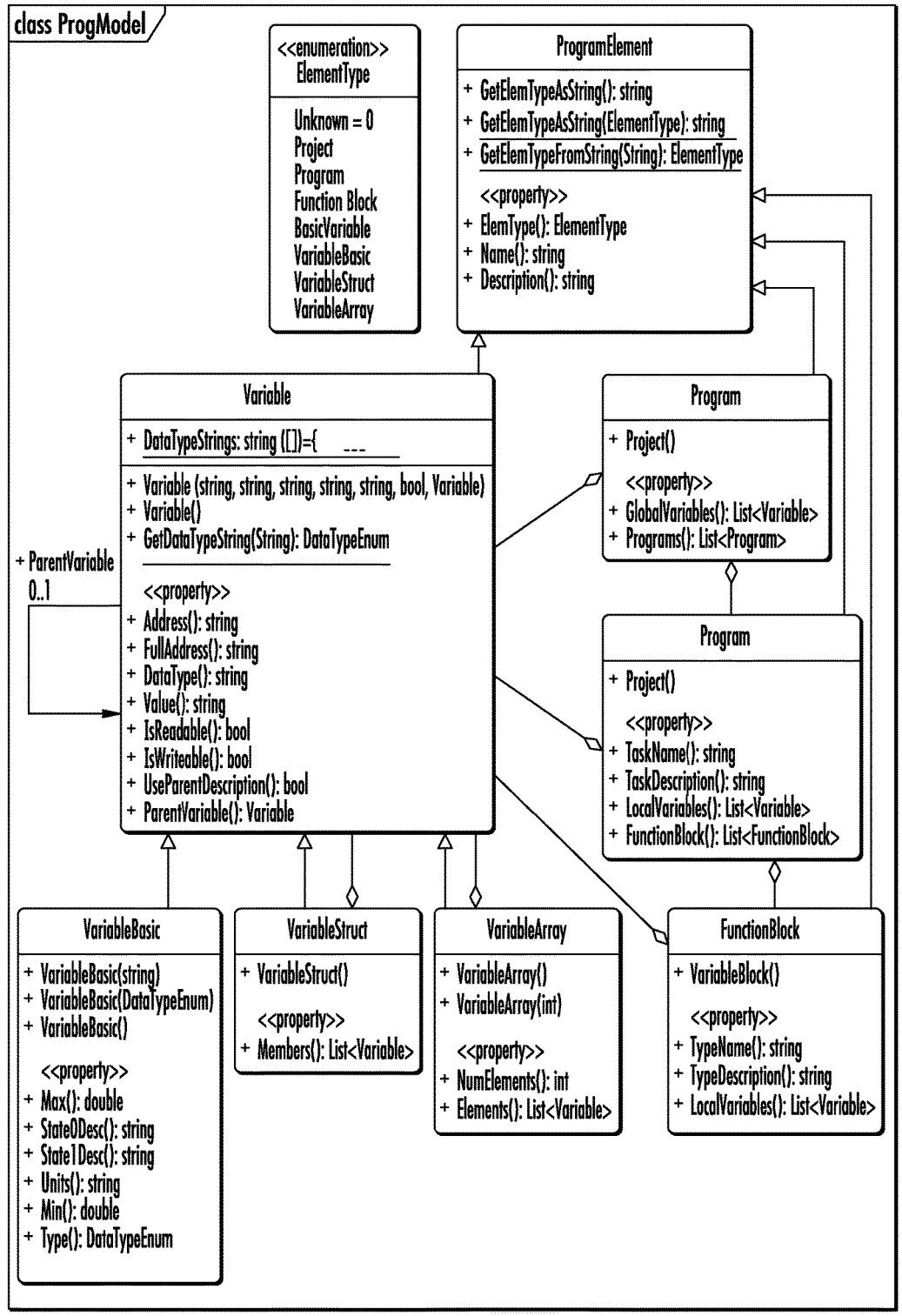
FIG. 6 is a class diagram showing a plurality of common program representation element types to describe the internal software component workings of the common representation, according to an example embodiment.
Figure 8A:
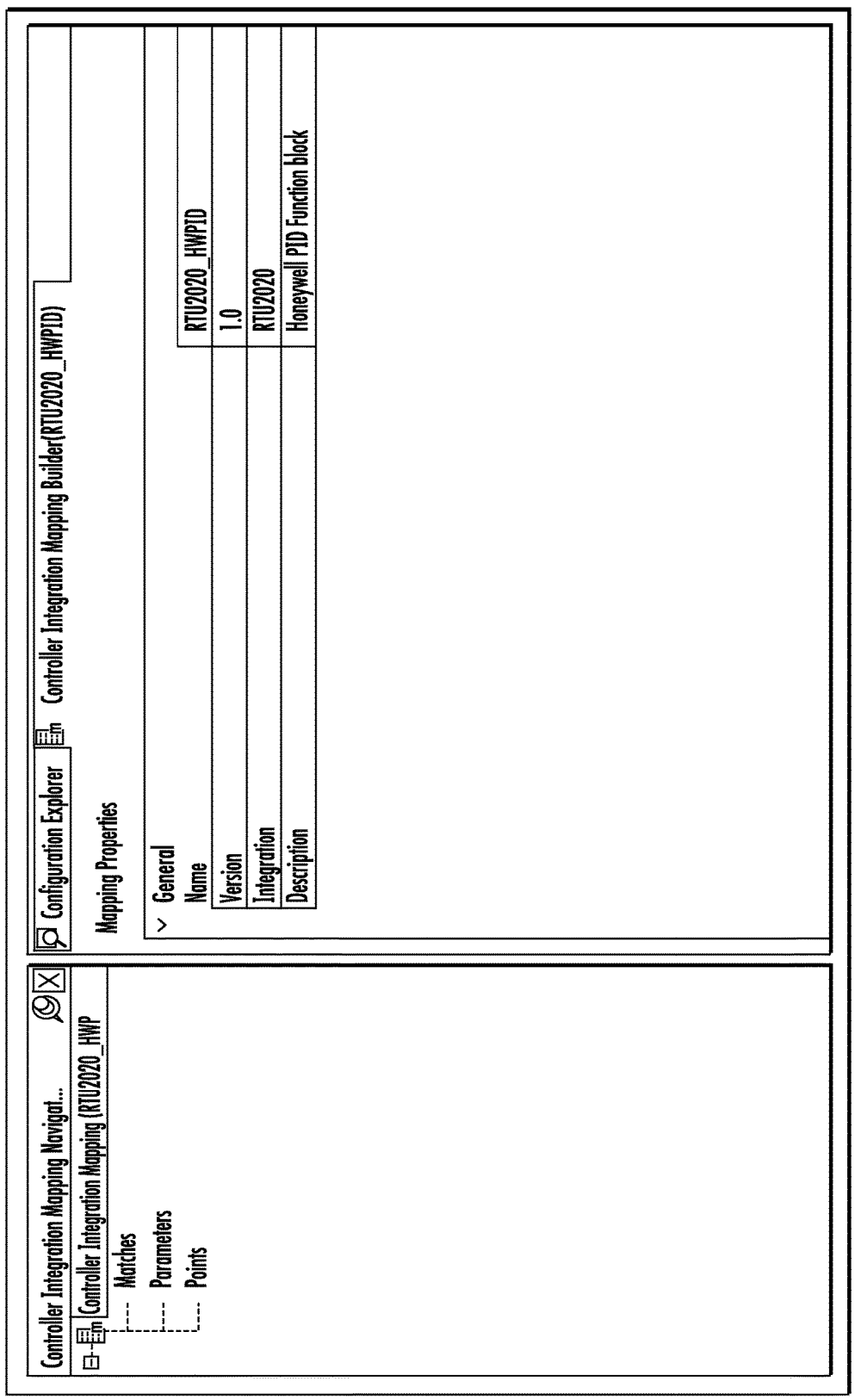
Figure 8B:
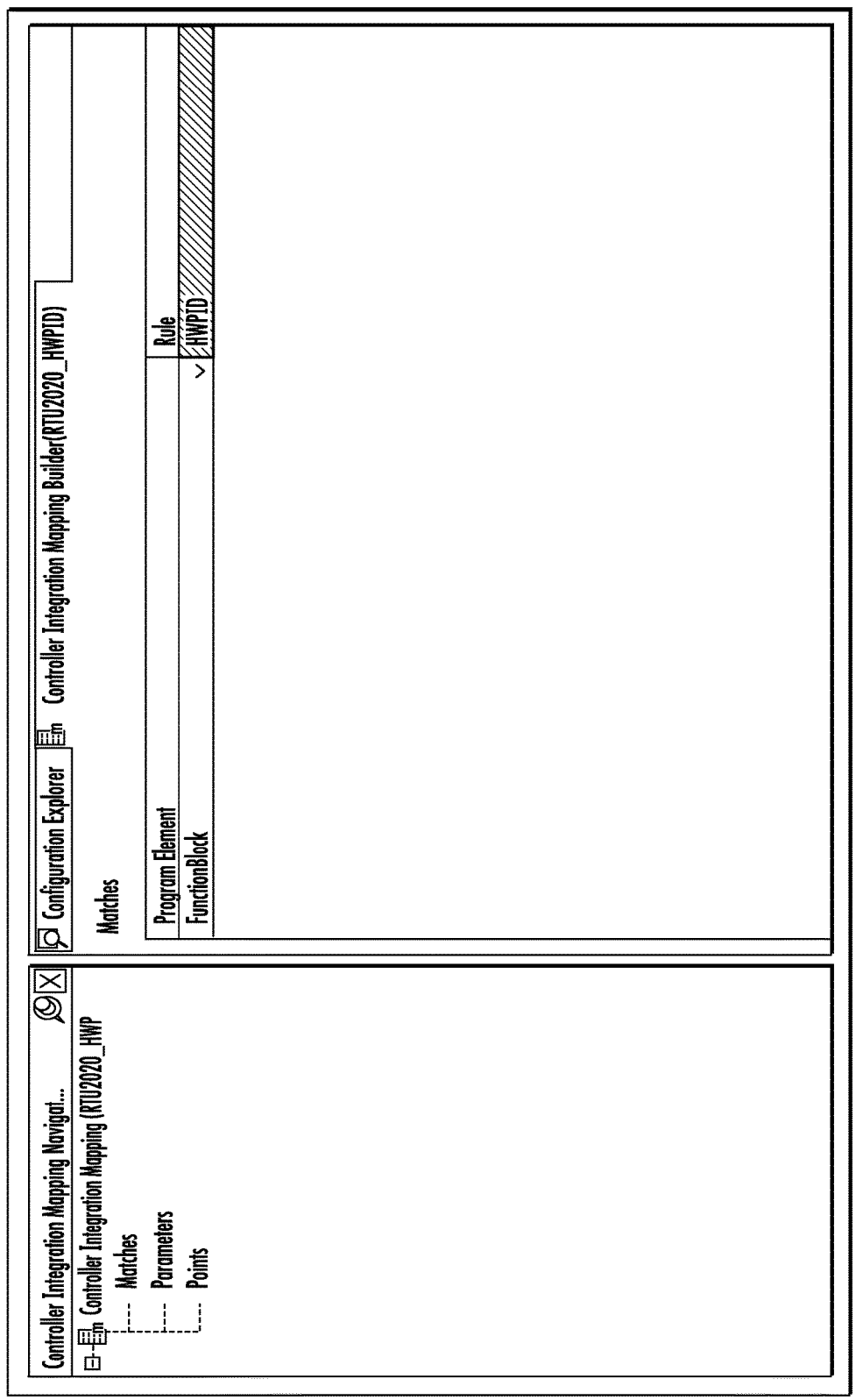

Regarding the common representation 120, as a screenshot is not possible because the common representation is an internal software component, a class diagram (which is in a software engineering standard notation called UML) is shown in FIG. 6. A plurality of common program element types are shown. The common program element shown include the basic variables 122 in FIG. 1 in the box with the label "VariableBasic", the structured variables 123 in FIG. 1 in the box with the label "VariableStruct", and array variables in the box with the label "VariableArray". Data type definitions for each element type is shown as ["+DataType( ): string for the 'Variable' box, and for Structured Variables the data type is defined through "+Members( ): List<Variable>" in the VariableStruct box. Each common program element type has attributes which may include the name (the "+Name( ) string" line in 'ProgramElement' box) description [the "+Description( ) string" line is in 'ProgramElement' box], addressing information [the "+Address( ) string" and "+FullAddress( ): string" and "+IsWriteable( ): bool" are all part of the addressing information in the 'Variable' box], state descriptors ["+State0Desc( ): string" & "+State1Desc( ) string" in 'VariableBasic' box], ranges [+Max( ) double" and "+Min( ) double" in VariableBasic box] and engineering units. ["+Units( ) string" in the VariableBasic box]". Connections & relationships between the program elements are represented by the lines with diamonds or no shapes between the boxes.

Regarding the mapping template files 140, FIG. 7 is a visual representation that shows an example mapping template file 140 in one implementation. The mapping template file 140 is shown by example as an Extensible Markup Language (XML structured text document). FIG. 7 shows the mapping template file 140 including mapping rules and mapping parameters defining how the program elements and program element attributes are mapped into at least one automation system point with point attributes, and values for each point attribute of the automation system point. On the 4$^{th}$ line shown there is a '<Match' line which is the mapping rule for this mapping template. Under that there are a few lines that begin with <Parameter which define the mapping parameters. The mapping of the program elements to system points is defined by the line starting with "<Item Name=" which defines the type of automation system point to be mapped to. Then all the lines beginning with "<Property id" map the program element(s) and their attributes, with the label immediately after the "id=" specifying the automation system point attribute, and then the expressions between the "[%" and "%]" define how the program element attribute values will be converted into the automation system point attribute.

The visual representation in FIGS. 8A, 8B, 8C and 8D are the graphical representation of a mapping template file 140 in the user interface 145 that users can use as a user friendly editor to create and edit these mapping template files rather than working directly in the raw text XML file shown in FIG. 7. The visual representation in FIG. 8A defines the general properties of the mapping template file 140, including the type of automation controller (e.g., DCS 230, PLC or RTU 240) it applies to. The visual representation shown in FIG. 8B defines the mapping rules for which program elements in the automation controller for this example mapping template may be matched to. As shown, for the program element Functionblock the mapping rule is HWPID.

The visual representation in FIG. 8C defines the user entered mapping parameters for the mapping template files 140 that may be specified (name, type and label), along with default values. The visual representation in FIG. 8D defines the mapping that takes values from the common representation 120 of the controller program file 110, and the user entered parameters, and any fixed text or values, in the point configuration and point attribute configuration. The table at the top center in FIG. 8D lists the points to be created (shown as an "analog point") when this mapping is matched with a program element (only one in this example) and the panel in the bottom center (under "Property details") defines values for each attribute of that point.

Figure 9:
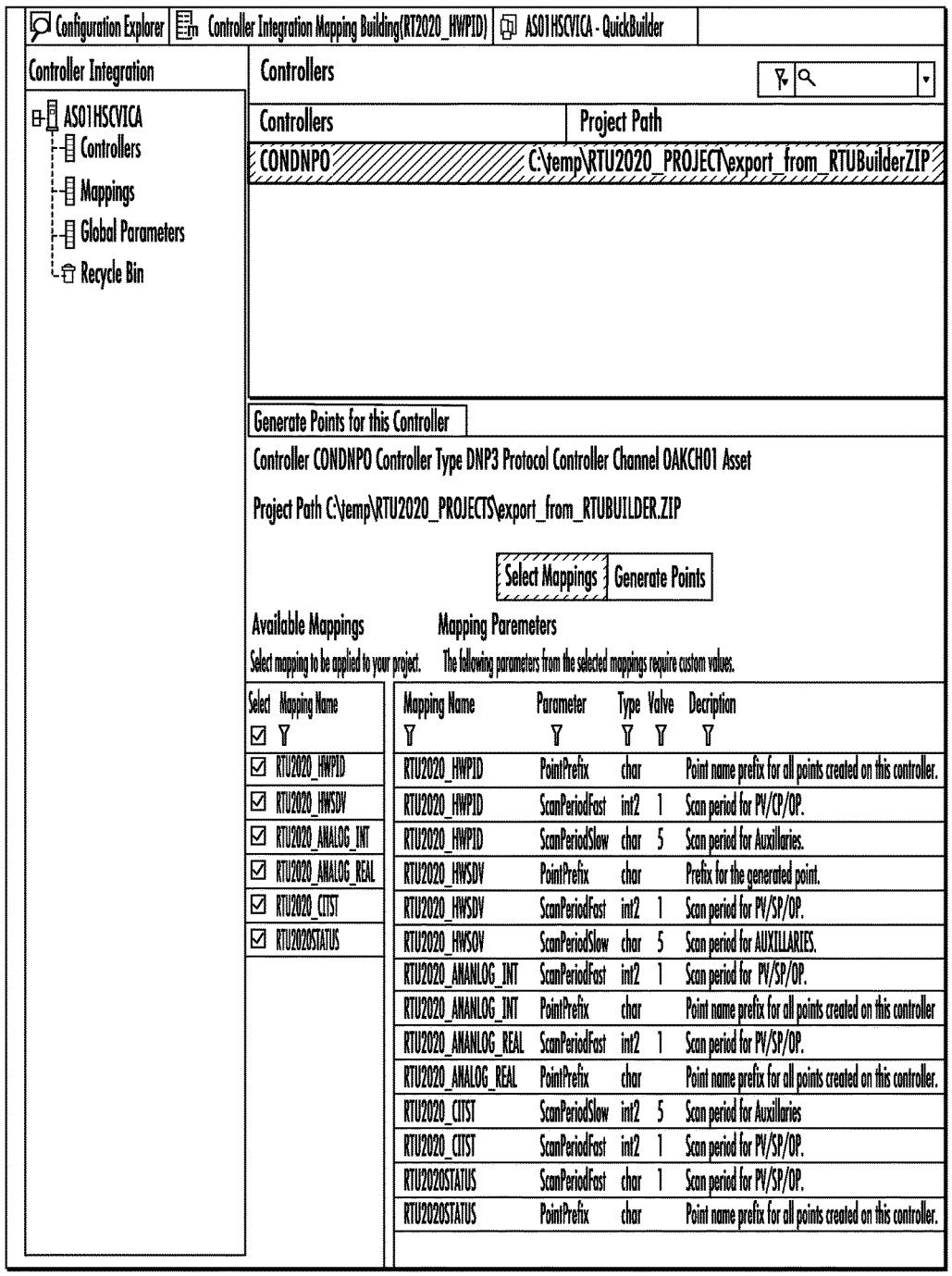
FIG. 9 is a visual representation of an example user interface for selecting the mapping templates to use for matching, and to enter the parameter values, according to an example embodiment.

FIG. 9 is a visual representation of an example user interface 145 for selecting the mapping templates 140 to use for matching, and to enter the parameter values. This selection is performed prior to the analysis of the program file in a current implementation. In this example implementation, it may not always be this way. FIG. 10 is a visual representation of a user interface 145 for selecting which mapping is to be applied. This is the screen presented to the user after the controller program file 110 has been analyzed and all the program elements are matched against the mapping template files 140. The mapping rule defined within the mapping template file 140 is matched against the program element type and/or program element attributes in the common representation 120. The rule may match with a plurality of program elements, and each program element may be matched by mapping rules in different mapping template files. Once the user has reviewed the matches and made any selections they can click a button on this screen to generate the point configuration. However, as described above, there is no need for user to complete the configuration. The method can run without user' input by simply choosing to set default values for attributes that cannot be derived from the program element attributes, so the user completing configuration is optional.

Figure 12:
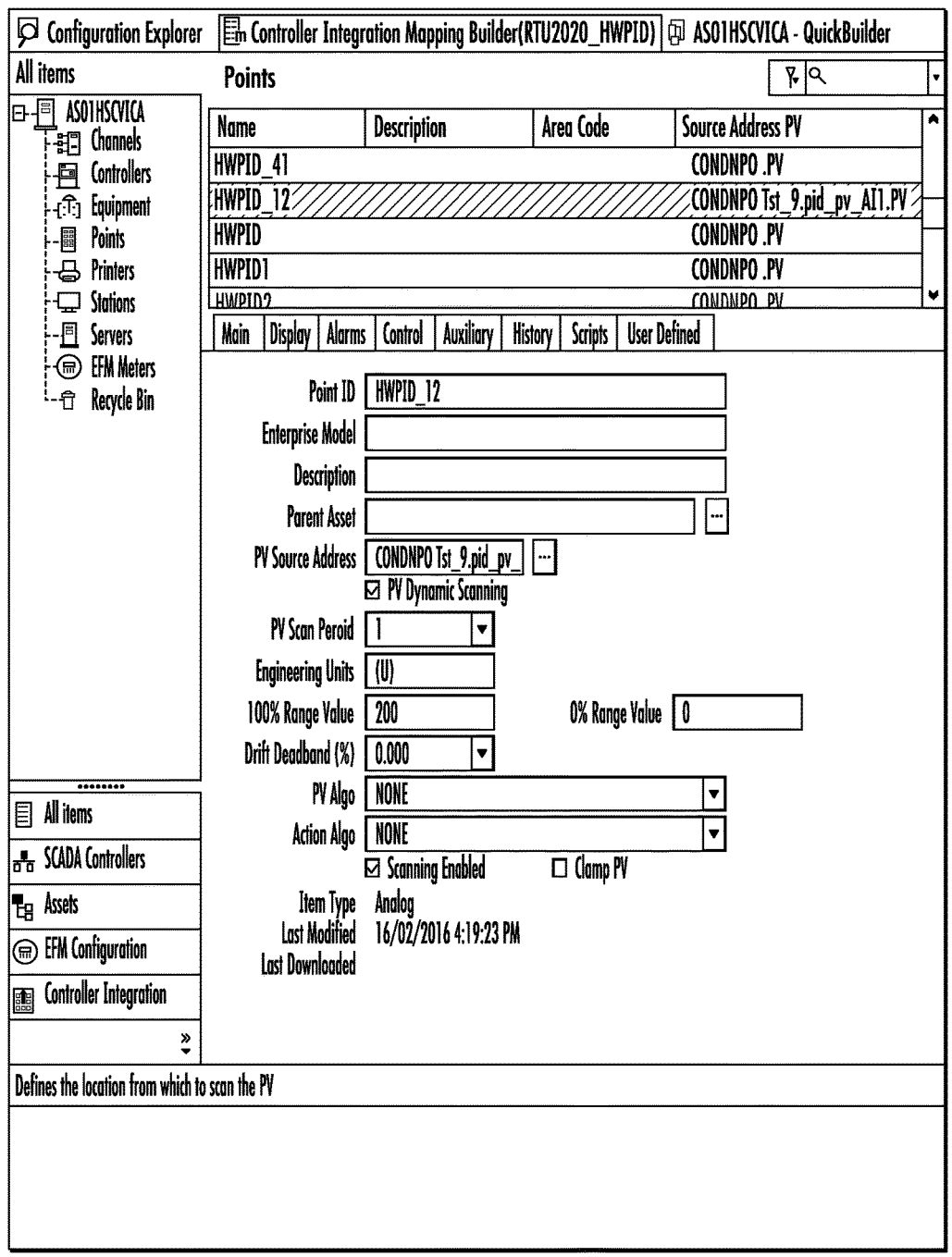
FIG. 12 is a visual representation of an example final point configuration generated and stored as it is visualized in the EXPERION Quick Builder point configuration tool, according to an example embodiment.

FIG. 11 is a visual representation of a sample verification process output (output by the verification report 150) titled "compare points" that shows the differences between the point configuration derived from the automation controller program file 110 and mapping template files 140, and the current point configuration in the point database 163. FIG. 12 is a visual representation of an example final point configuration generated and stored as it is visualized in the EXPERION Quick Builder point configuration tool. The top right table has a list of points, and the tabbed panel under that has all the point attribute values. The 'PV Source Address' will be populated at least in this example as this particular field provides the address that is requested to obtain real-time data from the automation controller. The point attributes define the real-time processing that is done in the automation system in order to present the real-time data generated in the automation controller.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of configuring an automation control system, comprising:

providing a processor that implements point configuration software stored in a memory associated with said processor and at least one automation controller program file having program elements and program element attributes executable in an automatic controller of said automation control system, said point configuration software:

translating at least an extract of said controller program file into a common representation including common program element types and common attributes for each of said common program element types;

applying mapping template files each including mapping rules and mapping parameters defining how said program elements and said program element attributes are mapped into at least one automation system point with point attributes, and values for each said point attribute;

matching at least one of said common program element types and said common attributes with said mapping template files using said mapping rules to generate at least one matching program element, and converting said matching program element into an automation system point configuration (system point configuration);

using said system point configuration as an interface to said automatic controller while running an industrial process to define real-time processing performed by said automation control system to present real-time data generated.

2. The method of claim 1, further comprising storing said system point configuration in a persistent data storage device of or accessible by said automation control system.

3. The method of claim 1, further comprising presenting said matching program element to a user adapted for said user to complete a configuration for said matching program element.

4. The method of claim 1, wherein said common representation comprises an object model representation.

5. The method of claim 1, further comprising parsing said controller program file into said common representation to assist in extending support to a new type of said automatic controller.

6. The method of claim 1, further comprising using a specified set of parameters supplied by a user to employ said mapping template files across different ones of a same type of said automation control system.

7. The method of claim 1, further comprising accepting modified ones of said mapping template files or modified ones of said controller program files and providing a new one of said system point configuration that is an aligned configuration relative to a control strategy defined by said controller program file.

8. Machine readable storage for configuring an automation control system, comprising:

a non-transitory machine readable storage medium having point configuration software code stored therein implementable by a processor, said code including:

code for translating at least an extract of an automation controller program file having program elements and program element attributes executable in an automatic controller of said automation control system into a common representation including common program element types and common attributes for each of said common program element types;

code for applying mapping template files each including mapping rules and mapping parameters defining how said program elements and said program element attributes are mapped into at least one automation system point with point attributes, and values for each said point attribute of said automation system point;

code for matching at least one of said common program element types and said common attributes with said mapping template files using said mapping rules to generate at least one matching program element, code for converting said matching program element into an automation system point configuration (system point configuration); and code for using said system point configuration as an interface to said automatic controller while running an industrial process to define real-time processing performed by said automation control system to present real-time data generated in said automatic controller.

9. The machine readable storage of claim 8, wherein said common representation comprises an object model representation.

10. The machine readable storage of claim 8, further comprising code for parsing said controller program file into said common representation to assist in extending support to a new type of said automatic controller.

11. The machine readable storage of claim 8, further comprising code for using a specified set of parameters supplied by a user to employ said mapping template files across different ones of a same type of said automation control system.

12. The machine readable storage of claim 8, further comprising code for accepting modified ones of said mapping template files or modified ones of said controller program files and providing a new one of said system point configuration that is an aligned configuration relative to a control strategy defined by said controller program file.

* * * * *